United States Patent
Barbulescu (10) Patent No.: US 8,656,980 B2
(45) Date of Patent: Feb. 25, 2014

(54) ADJUSTABLE LIGHT SHELF

(75) Inventor: Ion-Horatiu Barbulescu, Atlanta, GA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 13/427,434

(22) Filed: Mar. 22, 2012

(65) Prior Publication Data
US 2013/0248124 A1 Sep. 26, 2013

(51) Int. Cl.
*E05D 15/48* (2006.01)

(52) U.S. Cl.
USPC .............. 160/203; 160/208; 49/156; 49/157

(58) Field of Classification Search
USPC ........ 160/172 R, 205, 203, 208; 49/149, 152, 49/153, 154, 155, 156, 157, 80.1, 81.1
See application file for complete search history.

(56) References Cited

U.S. PATENT DOCUMENTS

| | | | | |
|---|---|---|---|---|
| 1,567,984 A | * | 12/1925 | Reid | 359/597 |
| 1,747,928 A | * | 2/1930 | Chesney | 359/597 |
| 5,568,703 A | * | 10/1996 | Frank et al. | 49/153 |
| 5,980,052 A | * | 11/1999 | Thor et al. | 359/877 |
| 6,239,910 B1 | * | 5/2001 | Digert | 359/596 |
| 6,714,352 B2 | * | 3/2004 | Rogers et al. | 359/596 |
| 7,843,640 B2 | | 11/2010 | Hooper, Jr. | |
| 8,027,092 B1 | * | 9/2011 | Huff et al. | 359/591 |
| 8,082,697 B2 | * | 12/2011 | Griffiths | 52/73 |
| 2010/0208454 A1 | * | 8/2010 | Braunstein et al. | 362/127 |
| 2010/0254011 A1 | * | 10/2010 | Griffiths | 359/597 |
| 2012/0180957 A1 | * | 7/2012 | Svirsky | 160/59 |

OTHER PUBLICATIONS

Hunter Douglas Contract: Light Shelves http://www.hunterdouglascontract.com/solarcontrol/lightshelves/index.jsp?trk_semgrp=ligh . . . Obtained Jun. 4, 2012, 1 page.
Tubelite® Aluminate(TM) Light Shelves http://www.tubeliteinc.com/product_types/aluminate/aluminate.html. Obtained Jun. 4, 2012, 1 page.
WAUSAU Window and Wall Systems, Booth #5048 at Greenbuild 2009, 2 pages.
YKK AP Luminance® Light Shelf System, http://www.ykkap.com/productmaster/Index.aspx?id=7213. Obtained Jun. 4, 2012, 1 page.
E-Lite(TM) Features/Benefits Projects http://www.elcocorp.com/ProductContext.aspx?SecondTab=true&product=80&line=4&typ . . . . Obtained Jun. 4, 2012, 2 pages.
InLighten® (Light Shelf) Features EC 97911-09. Kawneer, An Alcoa Company, Feb. 2009, 14 pages.

* cited by examiner

*Primary Examiner* — David Purol
(74) *Attorney, Agent, or Firm* — Greenberg Traurig, LLP (57) ABSTRACT

A light shelf for controlling solar radiation that impinges on a building has a panel with a pair of support brackets. The brackets run along tracks secured to the building and engage the tracks to assume a variety of elevations. The brackets can be moved independently, allowing the panel to be tilted and may have pivot joints to facilitate tilting. The panel may be mounted to the brackets in a way that allows the panel to translate horizontally. The panel may have a plurality of elements that can be adjusted to change the surface area and may be automated to respond to ambient conditions.

8 Claims, 10 Drawing Sheets

ADJUSTABLE LIGHT SHELF

FIELD

The present invention relates to devices and methods for controlling solar radiation and more particularly, to shades and reflectors for controlling and redirecting sunlight that enters a building through a window or other feature of a building that admits sunlight to the interior of the building.

BACKGROUND

Sunlight that enters a building frequently has beneficial lighting and heating effects but can also be objectionable if it raises the temperature inside the building to an uncomfortable level, causes sun damage to building contents or creates excessively bright or uneven illumination or glare. From the energy efficiency perspective, sunlight has the capacity to decrease energy usage by providing natural heat and light, thereby diminishing the need for energy-consuming artificial heating and lighting. In hot climates, however, solar radiation may produce unwanted heat that places additional demands on air conditioning equipment to reduce indoor temperatures. Furthermore, sunlight is sometimes too intense, e.g., to use for illumination of reading materials, and focused in areas of a building that are not optimal or useable due to position or concentration of the solar radiation. Indoor and outdoor shades of various kinds are known which block sunlight in whole or part to control the amount of solar radiation that enters a building. Apparatus are also known for use in redirecting light from its natural path, e.g., to illuminate areas of a building that would otherwise not be illuminated in the same manner by the incoming solar radiation. Notwithstanding the existence of known types of shades and light reflectors, alternative apparatus for controlling sunlight remain desirable.

SUMMARY

The disclosed subject matter relates to a light shelf for controlling solar radiation that impinges on a building. The light shelf has a panel capable of interacting with light, a stationary mounting element capable of occupying a fixed position relative to the building, and a moveable mounting element capable of coupling to the stationary mounting element and the panel and moveable between a plurality of positions relative to the stationary mounting element for selectively supporting the panel at a plurality of positions relative to the building.

In accordance with another aspect of the disclosure, the stationary mounting element includes a track along which the moveable element moves.

In accordance with another aspect of the disclosure, the moveable element includes a bracket moveable on the track and a retaining element capable of retaining the bracket at a selected one of the plurality of positions.

In accordance with another aspect of the disclosure, the stationary mounting element includes a plurality of tracks and the moveable element includes a pair of brackets, each bracket of the pair moveable along a corresponding one of the plurality of tracks.

In accordance with another aspect of the disclosure, each bracket of the pair of brackets is separately moveable relative to the other bracket of the pair.

In accordance with another aspect of the disclosure, at least one of the brackets includes a pivot coupling interposed between the panel and the corresponding track allowing the panel supported by the at least one bracket to tilt.

In accordance with another aspect of the disclosure, the panel tilts on the pivot coupling when one of the brackets of the pair is positioned at a higher elevation relative to the other bracket of the pair.

In accordance with another aspect of the disclosure, both brackets of the pair of brackets has a pivot coupling.

In accordance with another aspect of the disclosure, the pair of brackets may be moved conjointly on corresponding tracks of the plurality of tracks to selectively position the panel at one of a plurality of elevations relative to the building.

In accordance with another aspect of the disclosure, the brackets are moveable relative the tracks by a motor.

In accordance with another aspect of the disclosure, the brackets are moveable relative the tracks manually.

In accordance with another aspect of the disclosure, the panel includes a plurality of panel elements, at least one panel element moveable relative to another of the panel elements between at least first and second positions, the plurality of panel elements conjointly defining the dimensional extent of the light shelf.

In accordance with another aspect of the disclosure, the plurality of panel elements have a flat, planar configuration, the at least one moveable panel element stacked in parallel and moving parallel to the another of the panel elements when moving from the first position to the second position.

In accordance with another aspect of the disclosure, the first position is a retracted position and the second position is a deployed position, the retracted position resulting in the light shelf having a smaller dimensional extent relative to the dimensional extent in the deployed position.

In accordance with another aspect of the disclosure, the another of the panel elements has an internal hollow at least partially accommodating the at least one moveable panel element, which telescopes into and out of the another panel element to move between the retracted and deployed positions.

In accordance with another aspect of the disclosure, the movement of the at least one moveable panel element is by a motor.

In accordance with another aspect of the disclosure, the movement of the at least one moveable panel element is manual.

In accordance with another aspect of the disclosure, the retainer element is at least one of a clamp, a pin and detent, a screw drive, a pinion gear and a motor.

In accordance with another aspect of the disclosure, coupling of the moveable mounting element to the panel selectively permits the panel to be positioned at a selected side-to-side offset relative to the stationary element.

In accordance with another aspect of the disclosure, a light shelf for controlling solar radiation that impinges on a building, has a panel capable of interacting with light, the panel including a plurality of panel elements, at least one panel element moveable relative to another of the panel elements between at least first and second positions, the plurality of panel elements conjointly defining the dimensional extent of the light shelf. The light shelf has a stationary mounting element capable of occupying a fixed position relative to the building, and a moveable mounting element capable of coupling to the stationary mounting element and the panel and is moveable between a plurality of positions relative to the stationary mounting element for selectively supporting the panel at a plurality of positions relative to the building.

In accordance with another aspect of the disclosure, the stationary mounting element includes a pair of tracks and the moveable element includes a pair of brackets, each bracket of the pair moveable along a corresponding one of the pair of tracks and capable of engaging the track at a plurality of positions to retain the bracket at a selected one of the plurality of positions, each bracket of the pair of brackets capable of moving separately relative to the other bracket of the pair, at least one of the brackets including a pivot coupling interposed between the panel and the corresponding track allowing the panel supported by the at least one bracket to tilt.

In accordance with another aspect of the disclosure, the plurality of panel elements have a flat, planar configuration, the moveable panel element stacked and moving in parallel to another panel element when moving from the first position to the second position, the first position being a retracted position and the second position a deployed position, the retracted position resulting in the light shelf having a smaller dimensional extent relative to the dimensional extent in the deployed position, the another panel element having an internal hollow at least partially accommodating the moveable panel element, the moveable panel element telescoping into and out of the hollow between the retracted and deployed positions.

In accordance with another aspect of the disclosure, the light shelf has a pair of opposed frame elements, each of which have at least one slot, the moveable panel element capable of being slideably received in the at least one slot of opposed frame elements and of moving from the first position to the second position, the first position being a retracted position and the second position a deployed position, the retracted position resulting in the light shelf having a smaller dimensional extent relative to the dimensional extent in the deployed position, the another panel element being held between the opposed frame elements.

In accordance with another aspect of the disclosure, the light shelf has a pair of opposed frame elements, each having a pair of rotatable pulleys and a belt mounted on the pair of pulleys, wherein the moveable panel element is attached at one end to a first belt of the pair of belts and attached at another end to a second belt of the pair of belts and wherein the another panel element is attached at one end to a first belt of the pair of belts and attached at another end to a second belt of the pair of belts, the attachment of the moveable panel element to the pair of belts being offset from the attachment of the another panel element to the pair of belts, the belts being moveable on the pulleys to move the moveable panel element and the another panel element relative to one another to change a dimensional extent of the light shelf relative to the solar radiation.

In accordance with another aspect of the disclosure, the light shelf has a motor for adjusting at least one of the position and conformation of the light shelf and a sensor for sensing at least one of the ambient brightness and temperature, a microprocessor coupled to the sensor to receive data generated by the sensor, the microprocessor programmed to respond to the data by generating control signals to the motor to cause the light shelf to adjust.

BRIEF DESCRIPTION OF THE DRAWINGS

For a more complete understanding of the present invention, reference is made to the following detailed description of exemplary embodiments considered in conjunction with the accompanying drawings.

DETAILED DESCRIPTION OF EXEMPLARY EMBODIMENTS

Figure 1:
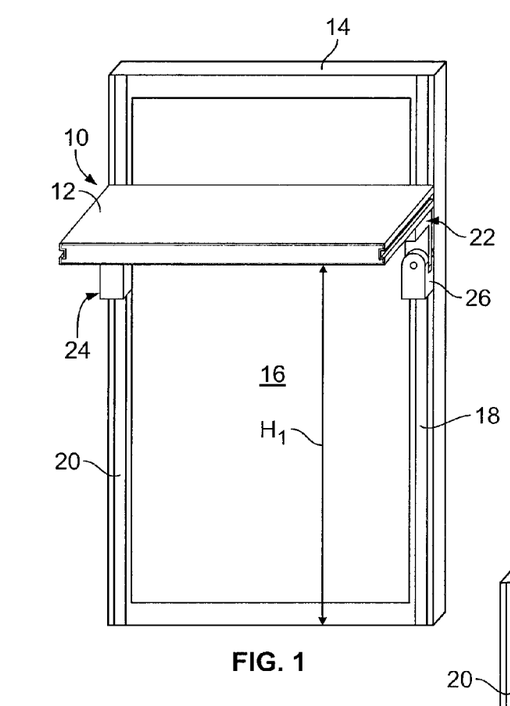
FIGS. 1-4 are perspective views of a light shelf in accordance with embodiments of the present disclosure and in a variety of positions.

FIG. 1 shows a light shelf 10 with a first panel 12 positioned relative to window frame 14 for controlling solar radiation that passes through window 16. The window frame 14 may be provided with a pair of tracks 18, 20 for adjustably supporting brackets 22, 24 that hold the first panel 12 in a selected position. The support brackets 22, 24 may engage the tracks 18, 20 via manually actuated clamps, detents, friction locks or slide locks. Alternatively, the brackets 22, 24 may have associated motors with pinion gears for engaging a rack gear parallel with the tracks 18, 20. Alternatively, the brackets 22, 24 may be positioned by rotatable helices (screw) drives provided within tracks 18, 20. In this later case, the brackets 18, 20 may be provided with apertures or forks that engage the helices, such that rotating a helix in a first direction results in the associated bracket going up and going down when the helix is turned in the other direction. As another alternative, the brackets 22, 24 may be moved by a linear motor. The brackets 22, 24 may be independently moved and may be moved in the same direction or opposite directions relative to the other.

Figure 2:
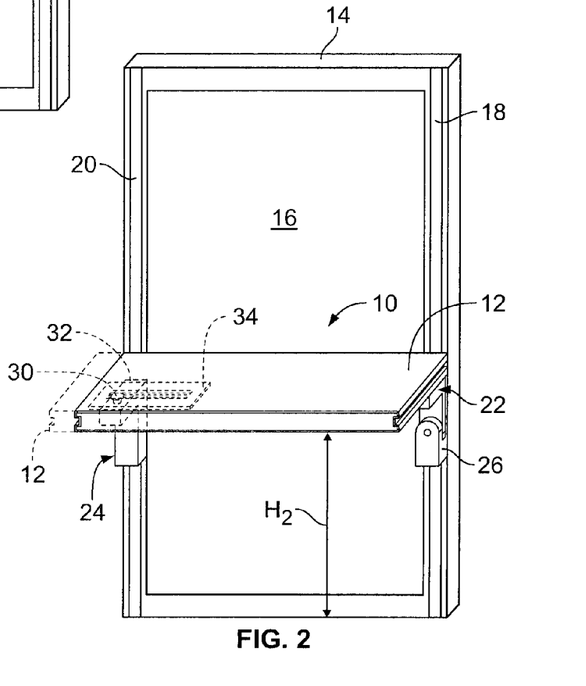
Figures 3, 4:
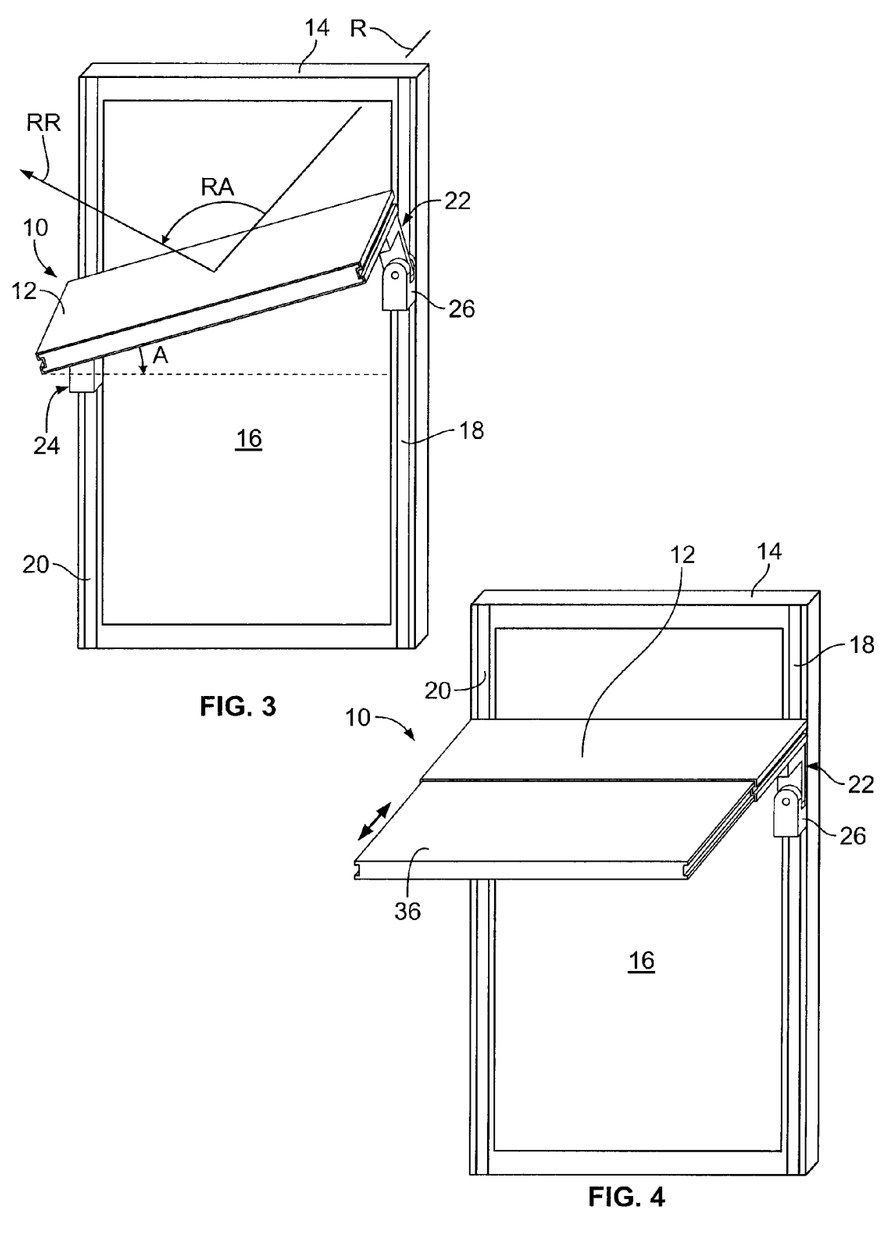

FIG. 1 shows that the first panel 12 may be positioned at a first height H1 relative to the bottom of the window frame 14. FIG. 2 shows that the first panel 12 may be lowered to another height H2, or positioned at any other selected height relative to window 16, in order to change the shading provided, to position the first panel 12 to be exposed to more or less solar radiation R, or to adjust the angle of reflection of the solar radiation RR reflected from the light shelf 12 (see FIGS. 5 and 6). The supporting brackets 22, 24 may feature pivot mounts 26 that enable the angular orientation of the first panel 12 to be adjusted, e.g., by positioning the supporting brackets 22, 24 at different heights on tracks 18, 20, as shown in FIG. 3, which shows a tilt angle A relative to the horizontal. As shown in FIG. 2, the first panel 12 may be held on one side to the bracket 24 by a capped pin 30 extending from an upper surface 32 of bracket 24, the cap of which is captured in a slotted plate 34 attached to the bottom surface of the first panel 12. This type of connection allows the first panel 12 to slide relative to the bracket 24 to assume different angles A and to accommodate the associated different distances between brackets 22, 24, when the panel 12 is moved to different angular orientations relative to the horizontal. This type of sliding connection may also be implemented at the interface between the first panel 12 and the bracket 22. As a further alternative, the side-to-side sliding position of the panel 12 relative to the brackets 22, 24 may be controlled by a manual or motor-driven gear train, which can be used to position the panel 12 at a desired offset relative to the window frame 14, as shown in dotted lines. The panel 12 may be extended sideways to different extents and in both directions. While the foregoing embodiment has been explained in terms of an apparatus utilizing a window frame 14 having tracks 18, 20, etc., it should be understood that the light shelf 10 may constitute an assembly, e.g., having a frame like 14 and/or tracks 18, 20 that is retrofitable to an existing window frame, wall or other structural surface or member proximate an opening in a structure/building that admits light into the structure, e.g., by fastening the light shelf 10 by screws, bolts, welding, adhesives, etc.

FIG. 3 illustrates that the light shelf 10 may assume a tilted orientation relative to the horizontal, viz., at tilt angle A. Radiation R impinging upon the first panel 12 is reflected off at an angle RA as reflected radiation RR, i.e., towards one side or the other of the window 16, as determined by the angle A.

Figure 8:
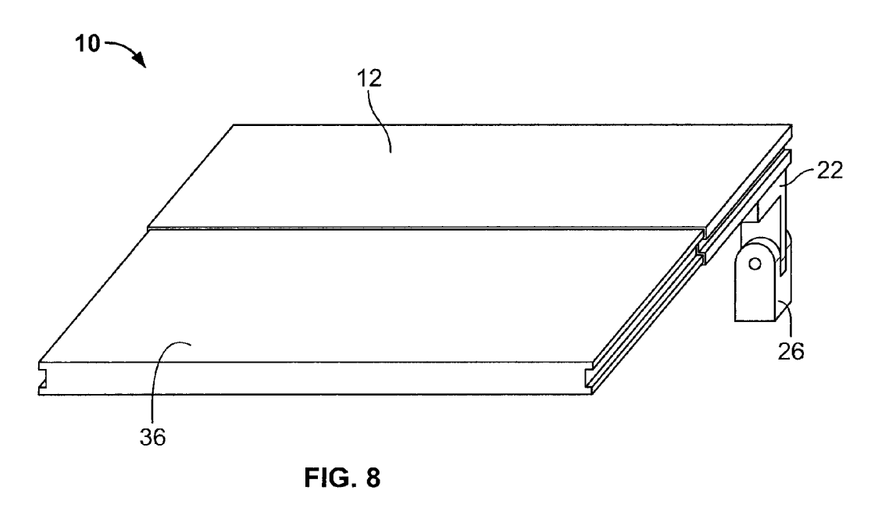
FIG. 8 is an enlarged perspective view of the light shelf of FIG. 4.

FIGS. 4 and 8 show an embodiment of the present disclosure wherein the first panel 12 is hollow and accommodates a second panel 36 which telescopes into the hollow first panel 12. The degree of deployment of the second panel 36 from the first panel 12 may be variable and/or controlled by an electric motor, e.g., acting through a rack and pinion, or by a spring which urges the second panel 36 to a deployed position and which acts against a control cord wound on a motor-driven take-up spool or other conventional motor/actuator positioning mechanisms. In the instance of a second panel 36 that is resiliently urged to a deployed position, the second panel 36, can absorb force that is exerted thereon, e.g., by a person or object that inadvertently bumps into the second panel 36 without breaking. The first and second panels 12, 36 may be made from metal, such as aluminum, or from plastics, such as a polypropylene honeycomb panel or a multiwall polycarbonate panel with aluminum or mylar skin on the reflective surface.

Figure 5:
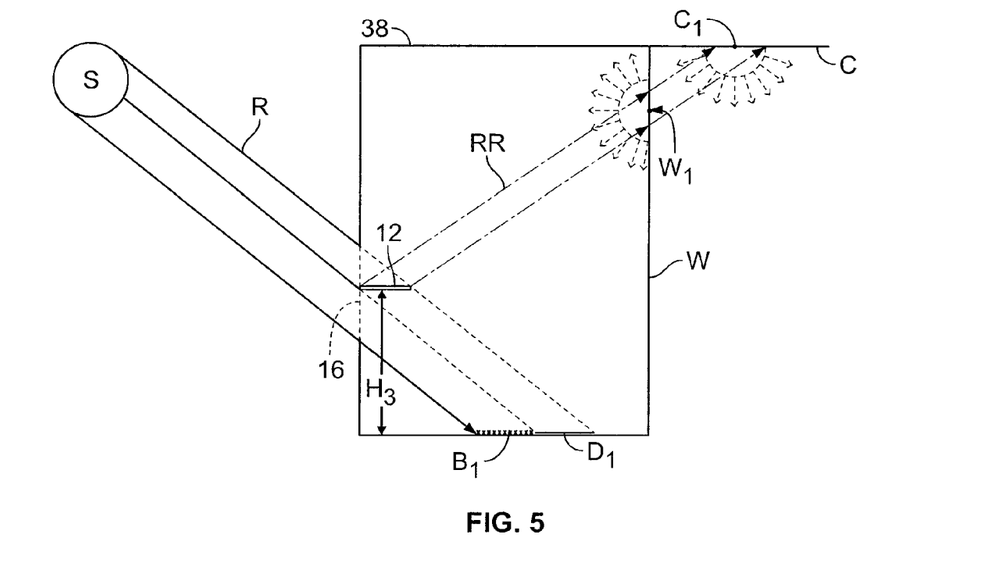
FIGS. 5-7 are diagrams illustrating selected positions of the light shelf of FIGS. 1-4 and the interaction of same with solar radiation/light.

FIG. 5 diagrammatically shows a building 38 having a window 16 (shown in dotted lines), with the sun S casting radiation R through the window 16. Some of the solar radiation travels to bright area B1, which could be a floor, a desk or any other type of surface. Another portion of the radiation R is intercepted by first panel 12 of light shelf 10 (see FIGS. 1-4) at height H3 relative to the floor and is at least partially reflected RR from the first panel 12 to an area W1 on wall W, or if the room were larger, to area C1 on ceiling C. The interception of light by first panel 12 results in a shaded area D1. The reflected light RR impacting W1 or C1 diffuses outwardly to a degree depending upon the type of surface at W1 or C1, e.g., as defined by color and texture. Similarly, the surface of first panel 12 from which light is reflected impacts the direction and amount of light reflected there from. A light diffuser (not shown) such as a translucent panel or frosted glass pane may be interposed between the first panel 12 and the impact area W1 or C1 to diffuse the reflected light RR before it reaches the wall W or ceiling C.

Figure 6:
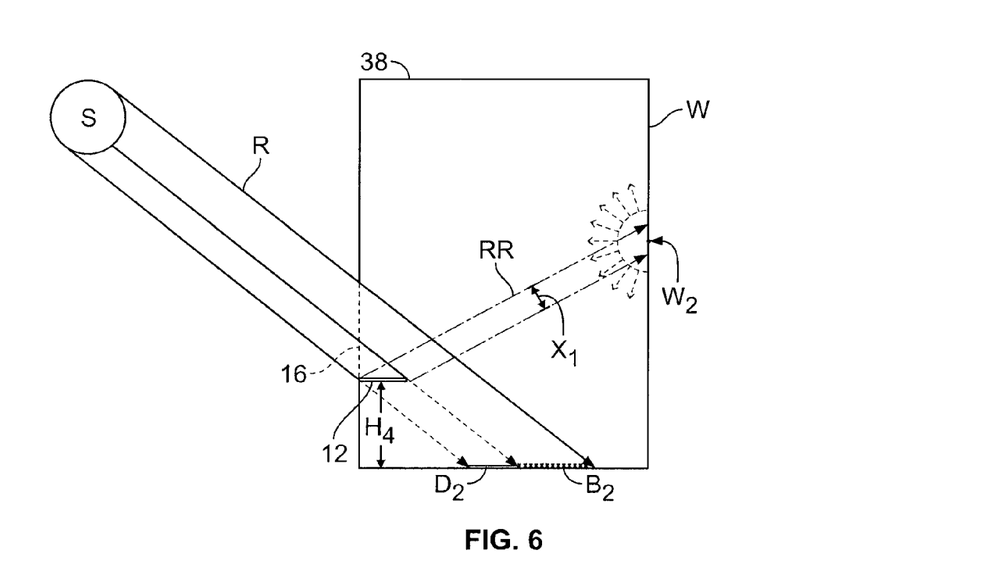

FIG. 6 shows the building 38 with window 16 and the sun S in the same position as in FIG. 5, casting radiation R through the window 16. The first panel 12 of light shelf 10 has been positioned at a different height H4 relative to the floor, resulting in differently positioned and sized shaded area D2 and bright area B2. The reflected light RR has a width X1 and impacts the wall W at area W2, which is lower on the wall W than W1. As can be appreciated from FIGS. 5 and 6, the adjustable light shelf 10 can be used to selectively control solar radiation to shade and illuminate different areas of a structure 38 having a window 16 using direct, reflected and diffused solar radiation.

Figure 7:
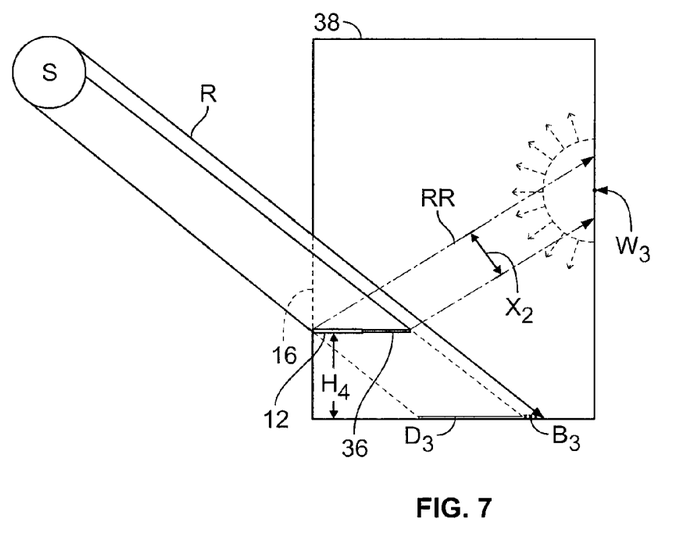

FIG. 7 shows the building 38 with window 16 and the sun S in the same position as in FIGS. 5 and 6, casting radiation R through the window 16. The first panel 12 of light shelf 10 is positioned at the same height H4 relative to the floor, as in FIG. 6. Second panel 36 has been deployed from the hollow of the first panel 12, resulting in a larger shaded area D3 and a smaller bright area B3 than in FIG. 6. The width X2 of the reflected light RR is also larger, as is the impact area W3 of reflected light. The position and state of deployment of light shelf 10 can be controlled manually, or driven by an electric motor controlled by an interface, such as a toggle switch. As a further alternative, an electrically driven system can be automated, i.e., controlled by a microcontroller, e.g., to automatically change the state/position of the light shelf 10 depending upon the changing position of the sun and/or depending upon empirically measured parameters, such as, the brightness of illumination and/or temperature within the structure 38.

Figure 9:
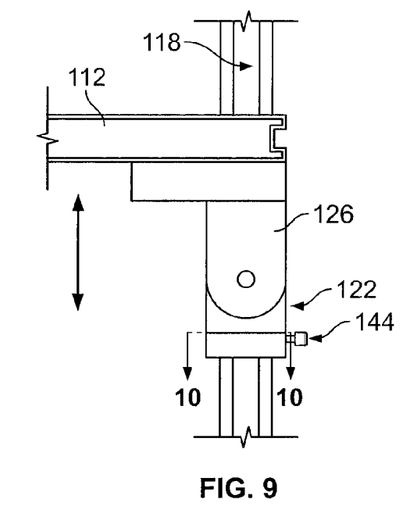
FIG. 9 is an elevational view of a bracket and track in accordance with an embodiment of the present disclosure.
Figure 10:
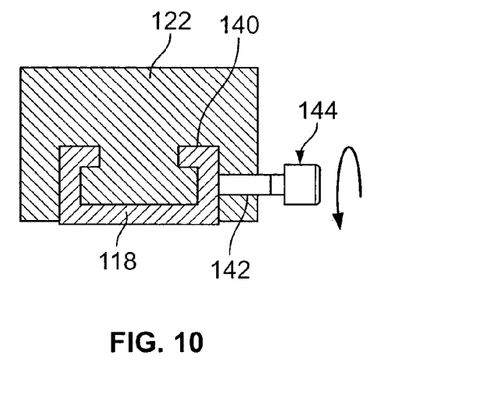
FIG. 10 is a cross-sectional view of the apparatus of FIG. 9 taken along lines 10-10 and looking in the direction of the arrows.

FIGS. 9 and 10 show a bracket 122 having a pivot mount 126 that supports a panel 112. The bracket 122 has a slot 140 that is shaped to mate with track 118, such that the bracket 122 can be slid up and down on the track 118 to position the panel 112 at a selected height. The bracket 122 has a threaded aperture 142 that receives a threaded pin 144. The threaded pin 144 can be screwed into the aperture 142 to bear against the track 118 to secure the bracket 122 at a given position relative to the track 118.

Figure 11:
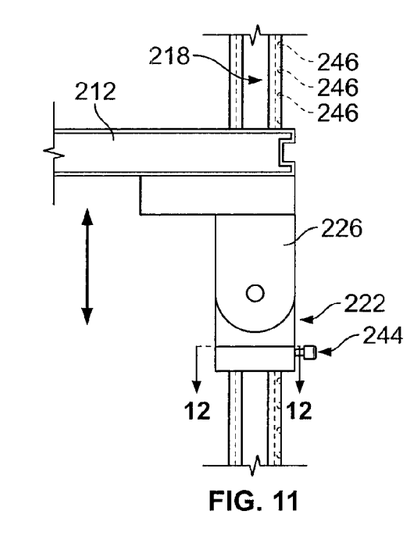
FIG. 11 is an elevational view of a bracket and track in accordance with an alternative embodiment of the present disclosure.
Figure 12:
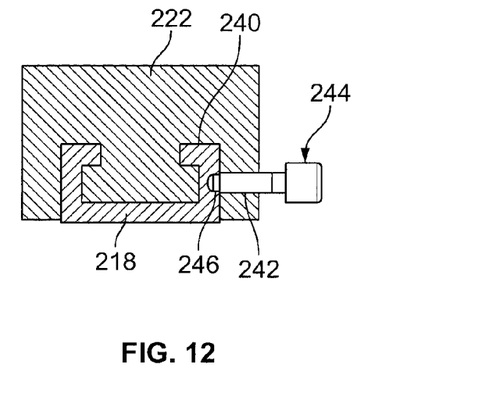
FIG. 12 is a cross-sectional view of the apparatus of FIG. 11 taken along lines 10-10 and looking in the direction of the arrows.

FIGS. 11 and 12 show a similar arrangement as that shown in FIGS. 9 and 10, wherein a bracket 222 having a pivot mount 226 supports a panel 212. The bracket 222 has a slot 240 that is shaped to mate with track 218, such that the bracket 222 can be slid up and down on the track 218 to position the panel 212 at a selected height. The bracket 222 has a threaded aperture 242 that receives a threaded pin 244. The threaded pin 244 can be screwed into the aperture 242 to bear against the track 118 to secure the bracket 222 at a given position relative to the track 218. The track 218 is provided with a plurality of apertures 246 that may receive a portion of the threaded pin 244 to provide a mechanical overlap, preventing the bracket 222 from sliding on the track 218.

Figure 13:
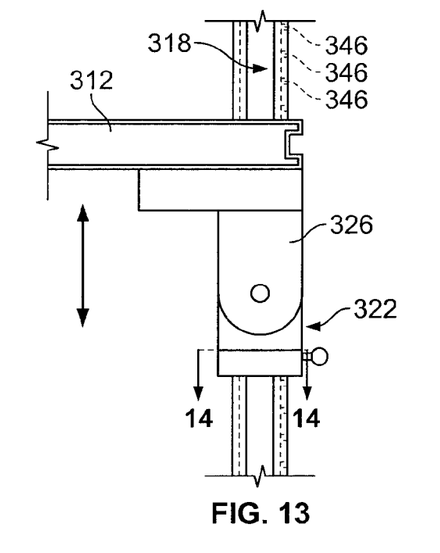
FIG. 13 is an elevational view of a bracket and track in accordance with an alternative embodiment of the present disclosure.
Figure 14:
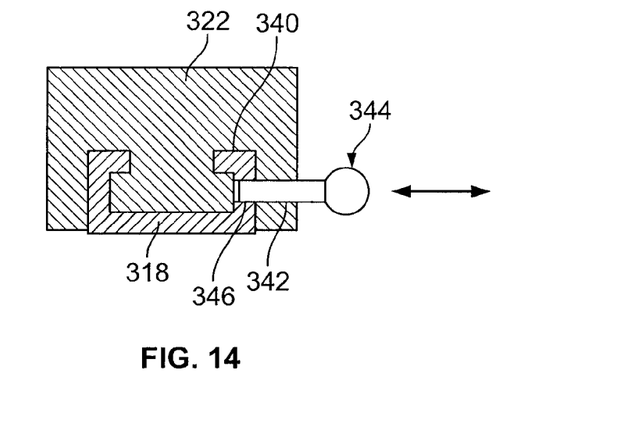
FIG. 14 is a cross-sectional view of the apparatus of FIG. 13 taken along lines 10-10 and looking in the direction of the arrows.

FIGS. 13 and 14 show a bracket 322 having a pivot mount 326 that supports a panel 312. The bracket 322 has a slot 340 that is shaped to mate with track 318, such that the bracket 322 can be slid up and down on the track 318 to position the panel 312 at a selected height. The bracket 322 has an aperture 342 that receives a slide pin 344. The slide pin 344 can be pushed into the aperture 342 and into a selected, aligned aperture 346 to secure the bracket 322 at a given position relative to the track 318.

Figure 15:
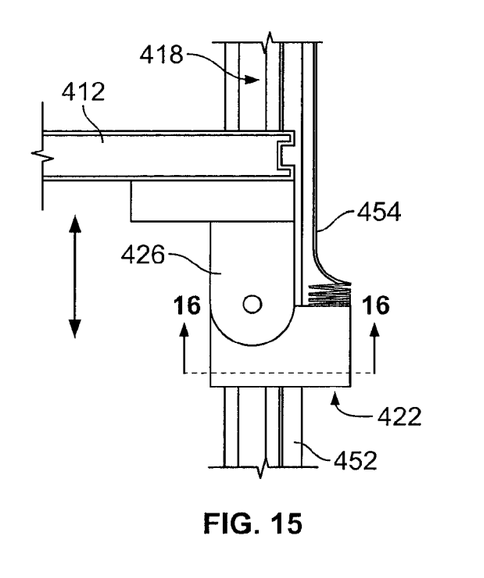
FIG. 15 is an elevational view of a bracket and track in accordance with an alternative embodiment of the present disclosure.
Figure 16:
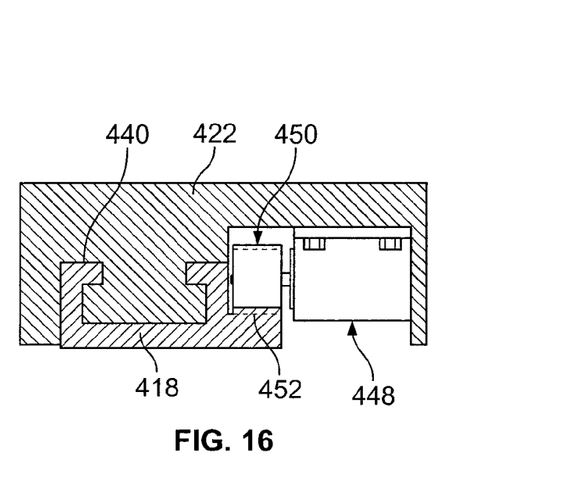
FIG. 16 is a cross-sectional view of the apparatus of FIG. 15 taken along lines 10-10 and looking in the direction of the arrows.

FIGS. 15 and 16 show a bracket 422 having a pivot mount 426 that supports a panel 412. The bracket 422 has a slot 440 that is shaped to mate with track 418, such that the bracket 422 can be slid up and down on the track 418 to position the panel 412 at a selected height. An electric motor 448 fastened to the bracket 422 has a pinion gear 450 that engages a rack 452 extending from the track 418. Activation of the motor 448 causes the pinion gear 450 to engage the rack 452 raising or lowering the bracket 422 on the track 418. A self-coiling electrical cord 454 may be used to supply electricity to the motor 448.

Figure 17:
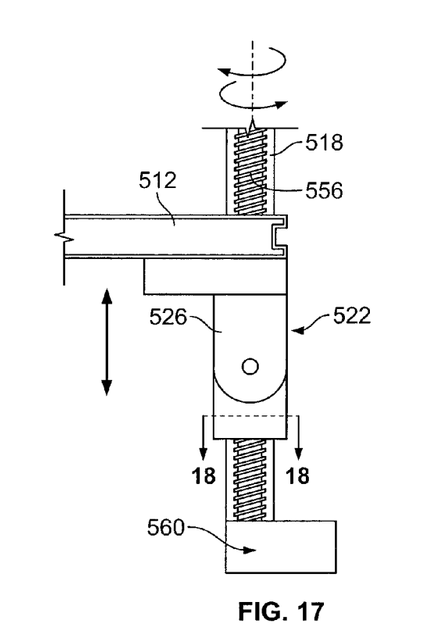
FIG. 17 is an elevational view of a bracket and track in accordance with an alternative embodiment of the present disclosure.
Figure 18:
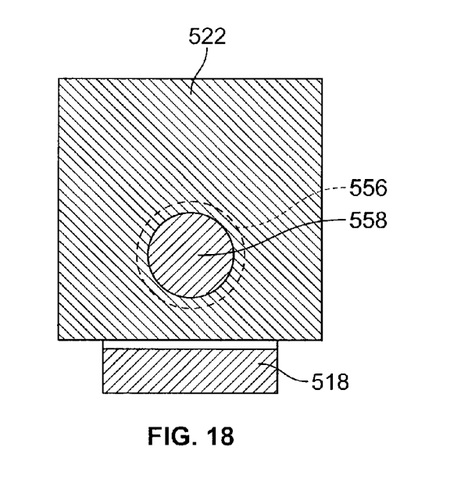
FIG. 18 is a cross-sectional view of the apparatus of FIG. 17 taken along lines 10-10 and looking in the direction of the arrows.

FIGS. 17 and 18 show a bracket 522 having a pivot mount 526 that supports a panel 512. The bracket 522 has a threaded aperture 556 that threadedly receives a helix rod 558 which is selectively turned by a motor/reduction gear unit 560. The helix rod 556 can be turned clockwise or counterclockwise causing the bracket 522 to move up and down, as desired. The proximity of the bracket 522 to the track 518 prevents the bracket 522 from rotating with the helix rod 556.

Figure 19:
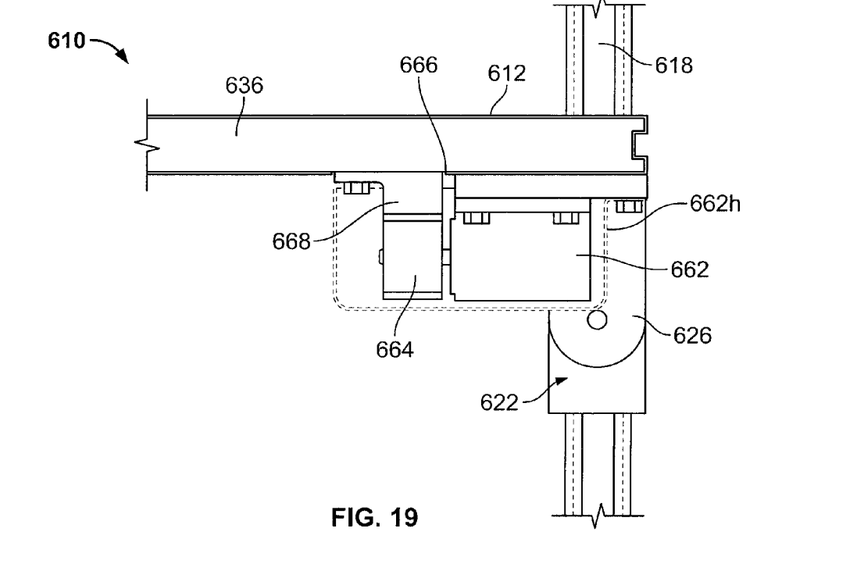
FIG. 19 is front view of a deployment mechanism in accordance with an embodiment of the present disclosure.
Figure 20:
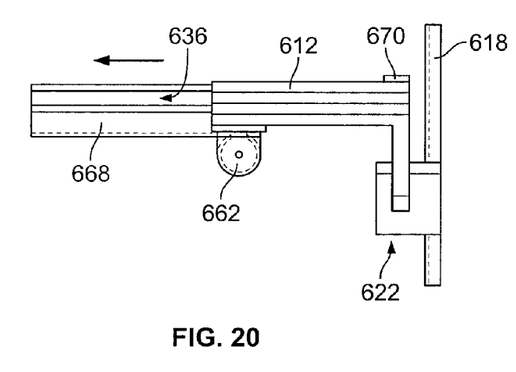
FIGS. 20 and 21 are side views of the apparatus of FIG. 19 showing the deployed and retracted positions, respectively.
Figure 21:
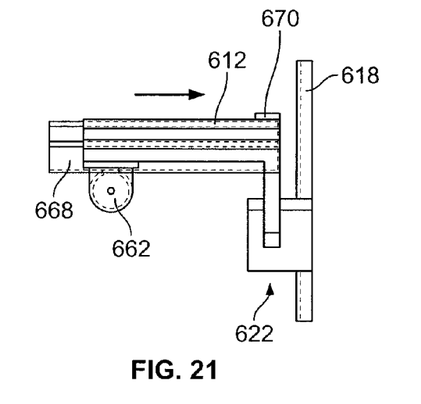

FIGS. 19-21 show a light shelf 610 having a bracket 622 with a pivot mount 626 that supports a hollow first panel 612 and a second panel 636 which telescopes into and out of the first panel 612. A motor 662 with a pinion gear 664 is mounted to the underside of the first panel 612, which has a slot 666 through which a rack 668 attached to the second panel 636 projects. The motor 662 and pinion gear 664 may have a housing 662h (shown in dotted lines). The motor-driven pinion gear 664 engages the rack 668 to allow the second panel 636 to be deployed, as shown in FIG. 20 and retracted, as shown in FIG. 21. As described above, the state of deployment of the second panel 636 may be used to control the amount of shade provided by the light shelf 610. A light and/or temperature sensor 670 may be employed to monitor the sunlight impacting the first panel 612 and/or the temperature. The bracket 622 may be moved up and down a track 618 and held at a selected position, e.g., by one of the apparatus described above in relation to FIGS. 9-18.

Figure 22:
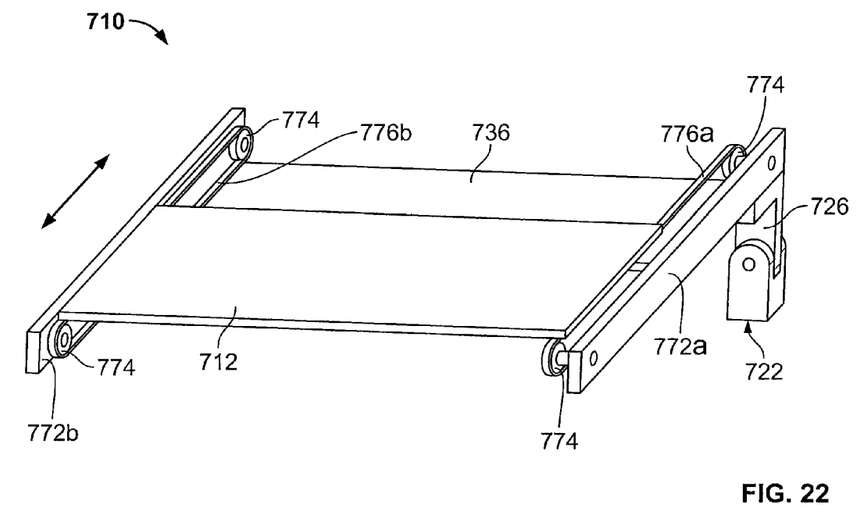
FIG. 22 is a perspective view of a light shelf in accordance with an alternative embodiment of the present disclosure.
Figure 23:
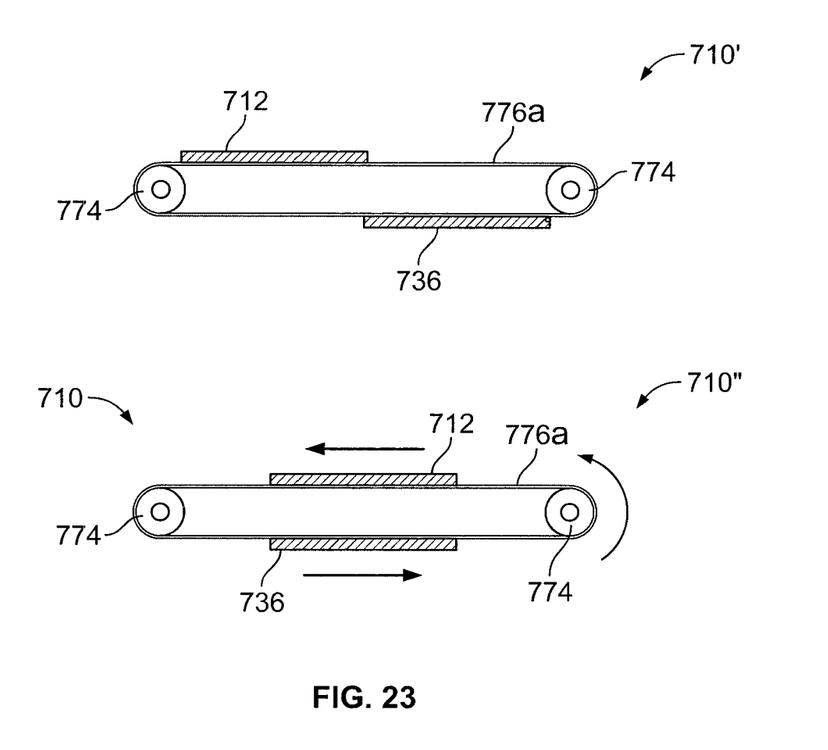
FIG. 23 is a sequence of schematic side views of the apparatus of FIG. 22 in two different positions.

FIGS. 22-23 show a light shelf 710 having a first panel 712 and a second panel 736. A pair of brackets 722 with pivot mounts 726 (only one side shown) support a corresponding pair of spaced frame members 772a, 772b on which are mounted a plurality of rotatable pulleys 774. As described above, e.g., in relation to FIGS. 1-21, the brackets 722 may be mounted to tracks (not shown), like tracks 18, 20, 118, etc., that allow positioning the brackets 722 at a selected position on the tracks 18, 20, 118, etc. The first panel 712 and the second panel 736 are attached to a pair of belts 776a, 776b, which are installed on the pulleys 774. As shown in FIG. 23, the panels 712, 736 may be moved relative to one another to provide greater or lesser shading by the light shelf 710' (greater) 710" (lesser). More particularly, when the panels 712, 736 are brought more closely into alignment, lesser shading is experienced and vice versa. The position of the belts 776a, 776b and panels 712, 736 may be controlled by a motor acting directly on a pulley 774 or on a belt, e.g., 776a, e.g., via a friction wheel.

Figure 24:
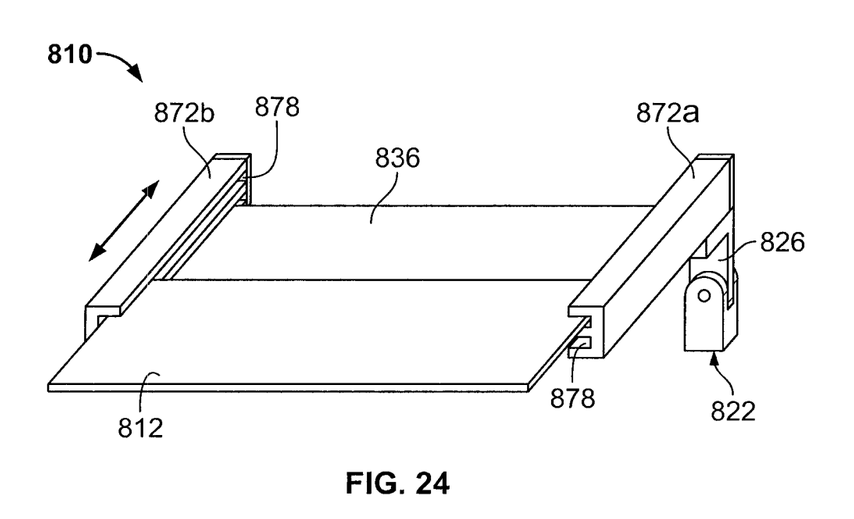
FIG. 24 is a perspective view of a light shelf in accordance with an alternative embodiment of the present disclosure.
Figure 25:
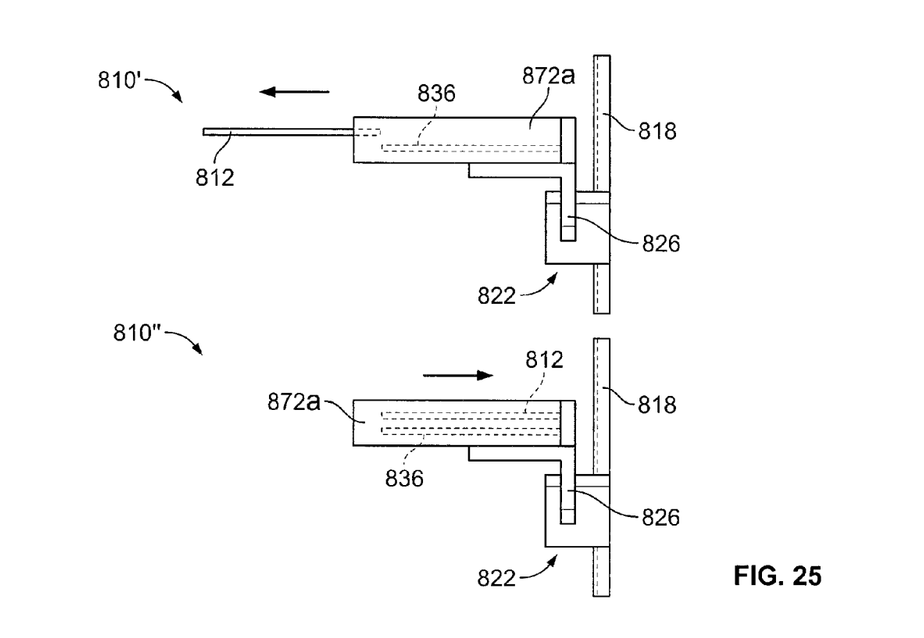
FIG. 25 is a sequence of schematic side views of the apparatus of FIG. 24 in two different positions.

FIGS. 24 and 25 show a light shelf 810 having a first panel 812 and a second panel 836. A pair of brackets 822 with pivot mounts 826 (only one side shown) support a corresponding pair of spaced frame members 872a, 872b, each having a pair of slots 878 for slideably accommodating the first panel 812 and the second panel 836. The brackets 822 may be mounted to tracks 818, like tracks 18, 20, 118, etc. described above, that allow positioning the brackets 822 at a selected position on the tracks 818. The first panel 812 and the second panel 836 are supported in the slots 878, one above the other, allowing each to be independently slid forward and backward. As shown in FIG. 25, the panels 812, 836 may be moved relative to one another to provide greater or lesser shading by the light shelf 810' (greater) 810" (lesser). More particularly, when the panels 812, 836 are brought more closely into alignment, lesser shading is experienced and vice versa. The position of the panels 812, 836 may be controlled by a motor or manually. While two panels 812, 836 are shown, a greater number of panels 812, 836 may be used and accommodated in corresponding slots 878.

Figure 26:
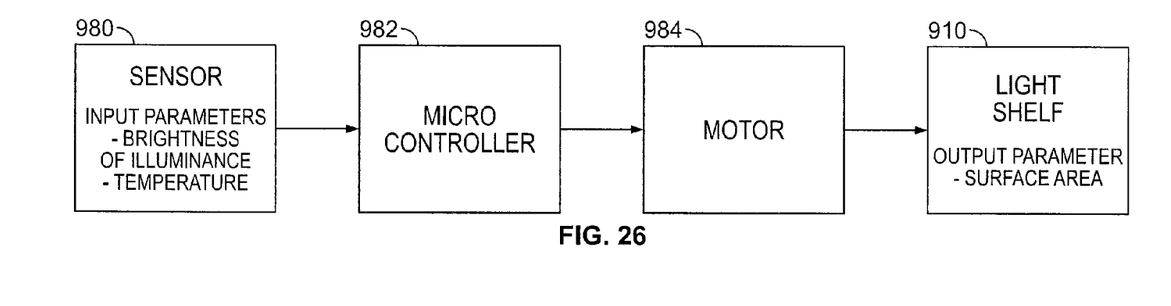
FIG. 26 is a diagram of components for controlling a light shelf in accordance with an alternative embodiment of the present disclosure.

FIG. 26 shows a control system for motorized embodiments of the light shelves described above that may be automated to respond to ambient conditions, e.g., light intensity/brightness of illumination and temperature. A light/heat sensor 980 can sense brightness/temperature and convey that information to microcontroller 982. The microcontroller can be programmed to analyze the input data and produce responsive output to a motor 984 that moves the light shelf 910 thereby changing the surface area exposed to incoming light and the shade provided by the light shelf 910.

It will be understood that the embodiments described herein are merely exemplary and that a person skilled in the art may make many variations and modifications without departing from the spirit and scope of the claimed subject matter. For example, while only one light shelf is shown in association with one window, a selected plurality of light shelves may be employed to control the light entering one or a plurality of windows. If a plurality of light shelves are employed they may be independently controlled or partially or completely coordinated, either electronically or by a mechanical linkage. All such variations and modifications are intended to be included within the scope of the appended claims.

I claim:

1. A light shelf, comprising:
   a panel capable of interacting with light for controlling solar radiation that impinges on a building;
   a stationary mounting element capable of occupying a fixed position relative to the building and having a plurality of tracks; and
   a pair of moveable mounting elements capable of coupling to the stationary mounting element and the panel, the pair of moveable mounting elements each including a bracket, yielding a pair of brackets, each bracket of the pair moveable along a corresponding one of the plurality of tracks and moveable between a plurality of positions relative to the stationary mounting element for selectively supporting the panel at a plurality of positions relative to the building, a retaining element capable of retaining a corresponding one of each of the moveable mounting elements at a selected one of the plurality of positions, each bracket of the pair of brackets being capable of separately moving relative to the other bracket of the pair.

2. A light shelf, comprising:
a panel capable of interacting with light for controlling solar radiation that impinges on a building;
a stationary mounting element capable of occupying a fixed position relative to the building and having a plurality of tracks; and
a pair of moveable mounting elements capable of coupling to the stationary mounting element and the panel, the pair of moveable mounting elements each including a bracket, each bracket moveable along a corresponding one of the plurality of tracks and moveable between a plurality of positions relative to the stationary mounting element for selectively supporting the panel at a plurality of positions relative to the building, each moveable mounting element having a retaining element capable of retaining the corresponding bracket at a selected one of the plurality of positions, each bracket capable of being separately moved relative to the other bracket,
wherein at least one of the brackets includes a pivot coupling interposed between the panel and the corresponding track allowing the panel supported by the at least one bracket to tilt.

3. The apparatus of claim 2, wherein the panel tilts on the pivot coupling when one of the brackets of the pair is positioned at a higher elevation relative to the other bracket of the pair.

4. The apparatus of claim 3, wherein both brackets of the pair of brackets has a pivot coupling.

5. The apparatus of claim 1, wherein the pair of brackets may be moved conjointly on corresponding tracks of the plurality of tracks to selectively position the panel at one of a plurality of elevations relative to the building.

6. The apparatus of claim 5, wherein the brackets are moveable relative the tracks manually.

7. The apparatus of claim 1, wherein the retainer element is at least one of a clamp, a pin and detent, a screw drive, a pinion gear and a motor.

8. The apparatus of claim 5, wherein a coupling of the moveable mounting elements to the panel selectively permits the panel to be positioned at a selected side-to-side off-set relative to the stationary element.

* * * * *